United States Patent
Yan et al.

(10) Patent No.: US 10,494,925 B1
(45) Date of Patent: Dec. 3, 2019

(54) AUTOMATIC STRAIGHTENING DEVICE AND METHOD FOR SCRAPER CONVEYOR ON FULLY-MECHANIZED COAL MINING FACE BASED ON TENSILE AND COMPRESSIVE FORCE SENSORS

(71) Applicants: CHINA UNIVERSITY OF MINING AND TECHNOLOGY, Xuzhou (CN); XUZHOU GOLDFLUID HYDRAULIC TECHNOLOGY DEVELOPMENT CO., LTD, Xuzhou (CN)

(72) Inventors: Haifeng Yan, Xuzhou (CN); Zhongbin Wang, Xuzhou (CN); Xuliang Lu, Xuzhou (CN); Chao Tan, Xuzhou (CN); Lei Si, Xuzhou (CN); Yiqiao Man, Xuzhou (CN); Kai Fan, Xuzhou (CN)

(73) Assignees: CHINA UNIVERSITY OF MINING AND TECHNOLOGY, Xuzhou (CN); XUZHOU GOLDFLUID HYDRAULIC TECHNOLOGY DEVELOPMENT CO., LTD, Xuzhou (CN)

( * ) Notice: Subject to any disclaimer, the term of this patent is extended or adjusted under 35 U.S.C. 154(b) by 0 days.

(21) Appl. No.: 16/303,143

(22) PCT Filed: Dec. 1, 2017

(86) PCT No.: PCT/CN2017/114276
§ 371 (c)(1),
(2) Date: Nov. 20, 2018

(87) PCT Pub. No.: WO2018/133562
PCT Pub. Date: Jul. 26, 2018

(30) Foreign Application Priority Data

Jan. 23, 2017 (CN) .......................... 2017 1 0058095

(51) Int. Cl.
| B65G 23/24 | (2006.01) |
| E21F 13/06 | (2006.01) |
| B65G 23/44 | (2006.01) |

(52) U.S. Cl.
CPC ............ *E21F 13/066* (2013.01); *B65G 23/44* (2013.01); *B65G 2201/045* (2013.01)

(58) Field of Classification Search
CPC .............................. E21F 13/066; B65G 23/24
(Continued)

(56) References Cited

U.S. PATENT DOCUMENTS 2,721,067 A * 10/1955 Russell ................... E21C 27/26
299/64
2,798,712 A * 7/1957 Ball ........................ E21C 27/26
299/68
(Continued)

FOREIGN PATENT DOCUMENTS

| CN | 102155222 A | 8/2011 |
| CN | 103114867 A | 5/2013 |
(Continued)

*Primary Examiner* — Douglas A Hess
(74) *Attorney, Agent, or Firm* — Gokalp Bayramoglu

(57) ABSTRACT

An automatic straightening device includes a fully-mechanized coal mining working face, which includes a plurality of middle troughs, and each middle trough is connected to a push-pull rod of one hydraulic support. The fully-mechanized coal mining working face is provided with the automatic straightening device. The automatic straightening device includes a flexible element rope, the tensile and compressive force sensors, and a signal processing device. Each middle trough is provided with two tensile and compressive force sensors; one end of the flexible element rope is connected to a rope extend-retract control device, and the other end of the flexible element rope sequentially passes through lifting rings to be connected to the tensile and
(Continued)

compressive force sensors and is fixed to a positioning force bearing bolt on the outermost side.

7 Claims, 1 Drawing Sheet

(58) Field of Classification Search
USPC ........ 198/617, 735.6; 299/1.05, 1.5, 1.6, 1.7
See application file for complete search history.

(56) References Cited

U.S. PATENT DOCUMENTS

| | | | | |
|---|---|---|---|---|
| 4,120,534 A * | 10/1978 | Addison | ................ | E21C 35/10 |
| | | | | 299/1.1 |
| 4,371,209 A * | 2/1983 | Alford | ................ | E21C 27/02 |
| | | | | 299/1.6 |
| 4,634,186 A * | 1/1987 | Pease | ................ | E21C 35/24 |
| | | | | 299/1.6 |
| 4,643,482 A * | 2/1987 | Wolfenden | ................ | E21C 35/24 |
| | | | | 299/1.6 |
| 4,733,770 A | 3/1988 | Temme | | |
| 4,822,105 A * | 4/1989 | Yamada | ................ | E21C 35/24 |
| | | | | 299/1.6 |
| 5,228,751 A * | 7/1993 | Ramsden, Jr. | ................ | E21C 35/24 |
| | | | | 299/1.6 |
| 5,553,925 A * | 9/1996 | Merten | ................ | E21C 35/24 |
| | | | | 299/1.1 |
| 6,666,521 B1 * | 12/2003 | Pease | ................ | E21C 27/24 |
| | | | | 299/1.05 |
| 6,772,134 B1 * | 8/2004 | Jacubasch | ................ | E21B 7/04 |
| | | | | 175/40 |
| 7,192,093 B2 * | 3/2007 | Jackson | ................ | E02F 3/20 |
| | | | | 299/10 |
| 7,600,822 B2 * | 10/2009 | Klabisch | ................ | E21C 29/16 |
| | | | | 299/1.6 |
| 7,695,071 B2 * | 4/2010 | Jackson | ................ | E21C 25/16 |
| | | | | 299/1.05 |
| 9,506,343 B2 * | 11/2016 | Ley | ................ | E21C 27/32 |
| 9,810,066 B2 * | 11/2017 | Westphalen | ................ | E21C 27/32 |
| 10,227,739 B2 * | 3/2019 | Laugwitz | ................ | E01C 23/088 |
| 10,378,352 B2 * | 8/2019 | Song | | |
| 2003/0075970 A1 * | 4/2003 | Hainsworth et al. | | |

FOREIGN PATENT DOCUMENTS

| | | |
|---|---|---|
| CN | 104891133 A | 9/2015 |
| CN | 105000328 A | 10/2015 |
| CN | 106986142 A | 7/2017 |

* cited by examiner

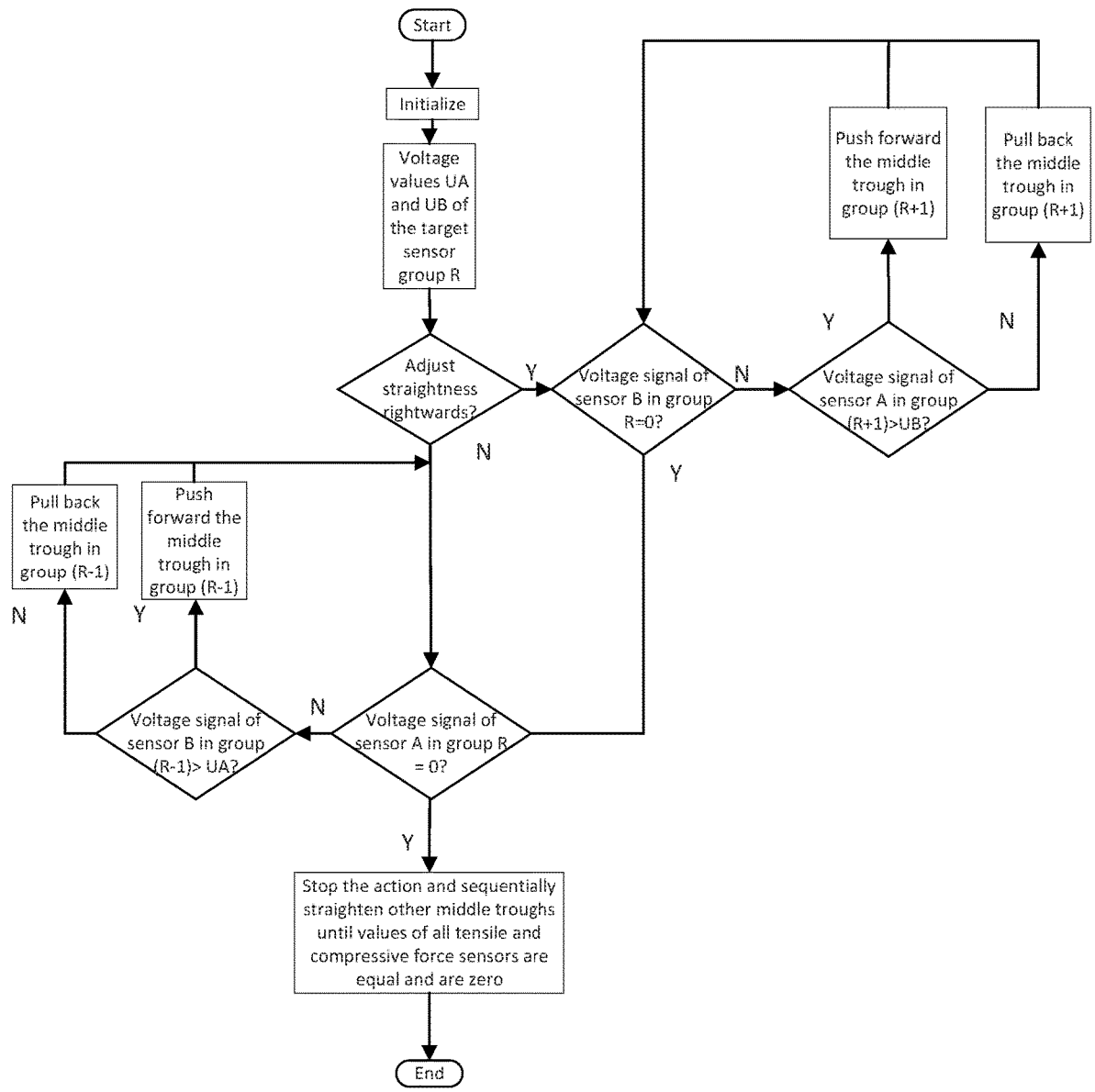

ably applied in metallurgy, building materials, cement, and other sectors. The scraper conveyor is a large-scale mechanical equipment, and upon failure, at best, a lot of time and material resources are wasted for maintenance; at worst, the machine is rendered useless, which will cause great economic loss to the enterprise and even threaten the life safety of workers.

AUTOMATIC STRAIGHTENING DEVICE AND METHOD FOR SCRAPER CONVEYOR ON FULLY-MECHANIZED COAL MINING FACE BASED ON TENSILE AND COMPRESSIVE FORCE SENSORS

CROSS REFERENCE TO THE RELATED APPLICATIONS

This application is the national phase entry of International Application No. PCT/CN2017/114276, filed on Dec. 1, 2017, which claims priority to Chinese Patent Application 201710058095.6 filed on Jan. 23, 2016, the entire contents of which are incorporated herein by reference.

TECHNICAL FIELD

The present invention relates to a device and method for controlling straightness of a scraper conveyor body on a fully-mechanized coal mining face, and specifically to automatic straightening for a scraper conveyor under a coal mine, and belongs to the field of automatic straightening for scraper conveyor bodies.

BACKGROUND

During use on a fully-mechanized coal mining working face, a scraper conveyor needs to withstand a variety of complex conditions such as compressive force, tensile force, impact, bending, friction, and corrosion. The scraper conveyor, under huge load impact, is also affected by the operating level of on-site workers. With improper operation, the body straightness of the scraper conveyor will be unable to meet production and use requirements, causing breakage of a scraper chain, wearing of middle troughs, and severe deformation of the conveyor body, and then causing a series of failures including even a failure in normal operation of the whole coal mining process, which has huge safety hazards. Failure handling of the scraper conveyor wastes a lot of time, and especially when the body straightness of the scraper conveyor cannot be guaranteed, on one hand, the working state of a hydraulic support on the roof of the fully-mechanized coal mining face; on the other hand, the scraper chain is tilted and wears out rapidly, the service life of the scraper chain is shortened, and even chain breakage is caused, and thus the scraper conveyor on the fully-mechanized coal mining face cannot work or operate and the production efficiency is affected. More than ten minutes are generally required if the scraper is tilted, while more than one and a half hour is required for stop handling in case of chain breakage, which has adverse effects on efficient production.

The scraper conveyor consists of a trough, a pulling chain, a scraper, a head drive chain, a tail tension sprocket, and the like, plays a very important role in coal production, has characteristics of large conveying capacity, long conveying distance, low energy consumption, and the like, and is not only used in coal and mines, but also widely applied in metallurgy, building materials, cement, and other sectors. The scraper conveyor is a large-scale mechanical equipment, and upon failure, at best, a lot of time and material resources are wasted for maintenance; at worst, the machine is rendered useless, which will cause great economic loss to the enterprise and even threaten the life safety of workers.

Most of domestic coal mines still use a manual method for straightening a scraper conveyor body, positions of middle troughs in the scraper conveyor are adjusted using an operating valve of a hydraulic support, and a displacement of a jack moved by the support is determined by workers according to the working condition of a fully-mechanized coal mining face and working experience. Since the working conditions underground are complex and the experience of the workers varies, the accuracy is low and this method is unreliable.

SUMMARY

In view of the aforementioned problems existing in the prior art, the present invention provides an automatic straightening device and method for a scraper conveyor on a fully-mechanized coal mining face based on tensile and compressive force sensors, where tensile and compressive force sensors in front of middle troughs and a flexible element rope are used as tool reference, and each middle trough is straightened using a central controller, so that the overall straightness of the scraper conveyor body is guaranteed, and the mechanism is simple, and has quick response, high precision, and high cost performance.

In order to achieve the aforementioned technical objective, the present invention will adopt the following technical solution:

An automatic straightening device for a scraper conveyor on a fully-mechanized coal mining face based on tensile and compressive force sensors includes a fully-mechanized coal mining working face, where the fully-mechanized coal mining working face includes a plurality of middle troughs, and each middle trough is connected to a push-pull rod of a hydraulic support, characterized in that the fully-mechanized coal mining working face is provided with the automatic straightening device, and the automatic straightening device includes a flexible element rope, the tensile and compressive force sensors, and a signal processing device, where each middle trough is provided with two tensile and compressive force sensors; one end of the flexible element rope is connected to a rope extend-retract control device, and the other end of the flexible element rope sequentially passes through lifting rings to be connected to the tensile and compressive force sensors and is fixed to a tensile and compressive force sensor (the sensor is replaced with a positioning force bearing bolt) on the outermost side; the rope extend-retract control device is capable of automatically adjusting extension and retraction of the flexible element rope according to positions of the middle troughs; the tensile and compressive force sensors are capable of detecting corresponding compressive force $F_Y$ and tensile force $F_L$ according to the extension and retraction of the flexible element rope, and capable of feeding back the detected compressive force $F_Y$ and tensile force $F_L$ to the signal processing device in real time; and according to the compressive force $F_Y$ and tensile force $F_L$ fed back by each tensile and compressive force sensor, the signal processing device compares, one by one, magnitudes of compressive force $F_Y$ and tensile force $F_L$ fed back by two adjacent tensile and compressive force sensors on two adjacent middle troughs, to control a position of a right-side middle trough of the two adjacent middle troughs and an action of a hydraulic support corresponding to the right-side middle trough, until values fed back by the two adjacent tensile and compressive force sensors on the two adjacent middle troughs are equal and are both zero, so as to complete rightward straightness adjustment; the signal processing device compares, one by one, magnitudes of compressive force $F_Y$ and tensile force $F_L$ fed back by two adjacent tensile and compressive force sensors on two adjacent middle troughs, to control a position of a left-side middle trough of the two adjacent middle troughs and an action of a hydraulic support corresponding to the left-side middle trough, until values fed back by the two adjacent tensile and compressive force sensors on the two adjacent middle troughs are equal and are both zero, so as to complete leftward straightness adjustment.

As a further improvement to the present invention, the tensile and compressive force sensor is a fiber grating tensile and compressive force sensor.

As a further improvement to the present invention, one end of the fiber grating tensile and compressive force sensor is mounted on the middle trough, and the other end of the fiber grating tensile and compressive force sensor is provided with a lifting ring; the flexible element rope is connected to the corresponding fiber grating sensors through respective lifting rings.

As a further improvement to the present invention, two tensile and compressive force sensors on each middle trough are respectively a tensile and compressive force sensor A and a tensile and compressive force sensor B; an imaginary line connecting a center of a lifting ring on the tensile and compressive force sensor A and a center of a lifting ring on the tensile and compressive force sensor B is parallel to both a rear end face and an upper end face of the middle trough.

As a further improvement to the present invention, two tensile and compressive force sensors on each middle trough are mounted on the rear end face of the middle trough at a distance of ¼ of a width of the middle trough from a left side edge and a right side edge respectively.

As a further improvement to the present invention, the tensile and compressive force sensors are fixedly mounted on the middle trough by means of bolt assemblies.

Another technical objective of the present invention is to provide an automatic straightening method for a scraper conveyor on a fully-mechanized coal mining face, which includes the following steps: (1) for a fully-mechanized coal mining scraper conveyor having N middle troughs, respectively mounting one tensile and compressive force sensor on a rear end face of the middle trough at a distance of ¼ of a width of the middle trough from each side edge of the middle trough, where a tensile and compressive force sensor on the left side of the middle trough is a tensile and compressive force sensor A, and a tensile and compressive force sensor on the right side of the middle trough is a tensile and compressive force sensor B; and for each middle trough, an imaginary line connecting a center of a lifting ring on the tensile and compressive force sensor A and a center of a lifting ring on the tensile and compressive force sensor B is parallel to the rear end face and an upper end face of the middle trough respectively; (2) connecting one end of a flexible element rope to a rope extend-retract control device and making the other end of the flexible element rope sequentially pass through lifting rings on top of the tensile and compressive force sensors and be fixed to a positioning force bearing bolt on the outermost side; (3) selecting one group as a target group according to information fed back by the tensile and compressive force sensor A and the tensile and compressive force sensor B on each middle trough, where compressive force is a positive value and tensile force is a negative value; and adjusting two middle troughs adjacent to the target group by using the target group as a reference for comparison; (4) rightward straightness adjustment: using a tensile and compressive force value detected by a tensile and compressive force sensor B in the target group as a reference value U; if a tensile and compressive force value detected by a tensile and compressive force sensor A in the adjacent group on the right side is greater than the reference value U, generating a positive voltage signal and controlling a hydraulic support to push forward a middle trough in the corresponding group; if a tensile and compressive force value detected by a tensile and compressive force sensor in the adjacent group on the right side is less than the reference value U, generating a negative voltage signal and controlling a hydraulic support to pull back a middle trough in the corresponding group, until the tensile and compressive force value detected by the tensile and compressive force sensor B in the target group and the tensile and compressive force value detected by the tensile and compressive force sensor A in the adjacent group on the right side are equal and are equal to zero; using the adjacent group that completes positioning as a target group for sequentially adjusting adjacent groups rightwards, and repeating the aforementioned steps until all the middle troughs are in a straight line; and (5) leftward straightness adjustment: using a tensile and compressive force value detected by a tensile and compressive force sensor A in the target group as a reference value U, and if a tensile and compressive force value detected by a tensile and compressive force sensor B in the adjacent group on the left side is greater than the reference value U, generating a positive voltage signal and controlling a hydraulic support to push forward a middle trough in the corresponding group; if a tensile and compressive force value detected by a tensile and compressive force sensor in the adjacent group on the left side is less than the reference value U, generating a negative voltage signal and controlling a hydraulic support to pull back a middle trough in the corresponding group, until the tensile and compressive force value detected by the tensile and compressive force sensor A in the target group and the tensile and compressive force value detected by the tensile and compressive force sensor B in the adjacent group on the left side are equal and are equal to zero; using the adjacent group that completes positioning as a target group for sequentially adjusting adjacent groups leftwards, and repeating the aforementioned steps until all the middle troughs are in a straight line.

According to the aforementioned technical solutions, as compared with the prior art, the present invention has the following advantages:

the device uses the tensile and compressive force sensors as detection tools and the flexible element rope as a virtual digital reference straight line, compressive force and tensile force detected by the tensile and compressive force sensor are converted into voltage signals and transmitted to a signal processing control system for data fitting, and positions of the middle troughs are adjusted according to the result of signal processing, so that tensile and compressive force values in all groups are equal and are equal to zero, and then automatic straightening of the scraper conveyor body is completed. The device has high precision and cost performance, can overcome the severe environment under a coal mine and has long service life.

BRIEF DESCRIPTION OF THE DRAWINGS

FIG. 1 is a schematic flowchart of an automatic straightening method for a scraper conveyor in the present invention.

DETAILED DESCRIPTION OF THE EMBODIMENTS

The technical solutions in the embodiments of the present invention will be clearly and fully described below with reference to the accompanying drawings in the embodiments of the present invention. It is obvious that the embodiments to be described are only a part rather than all of the embodiments of the present invention. The following description of at least one exemplary embodiment is actually illustrative only, and not intended to be any limitation on the present invention and its application or use. All other embodiments derived by those of ordinary skill in the art based on the embodiments of the present invention without carrying out creative activities should fall within the scope of the present invention. The relative arrangement of parts and steps, expressions, and numeric values set forth in these embodiments are not to be construed as limiting the present invention, unless otherwise specified. It is also understood that, for convenience of description, the sizes of the various components shown in the drawings are not necessarily drawn in actual proportional relationship. Techniques, methods, and devices known to those of ordinary skill in the relevant art may not be discussed in detail, but in appropriate situations, these techniques, methods, and devices should be considered as part of the granted specification. In all examples shown and discussed herein, any particular values should be construed as merely illustrative, rather than as limitation. Therefore, other examples of the exemplary embodiments may have different values.

Spatially relative terms, such as "over . . . ", "above . . . ", "on the upper surface of . . . ", and "on", may be used herein for ease of description to describe the spatial position relationship of one component or feature with another component or feature, as illustrated in the FIGURES. It will be understood that the spatially relative terms are intended to encompass different orientations of the component in use or operation in addition to the orientations depicted in the FIGURES. For example, if the component in the FIGURES is turned over, the component described as "above another component or configuration" or "over another component or configuration" would then be oriented "below another component or configuration" or "beneath another component or configuration". Thus, the exemplary term "above . . . " may encompass both an orientation of "above . . . " and "below . . . ". The component may be otherwise oriented (rotated 90 degrees or at other orientations).

As shown in FIG. 1, an automatic straightening device for a scraper conveyor on a fully-mechanized coal mining face based on tensile and compressive force sensors in the present invention includes a signal collection system, a signal processing control system, and a mechanism execution system. The signal collection system mainly includes fiber grating tensile and compressive force sensors and a flexible element rope, which are mounted on rear end faces of middle troughs; the signal processing control system mainly consists of a data transmission module and a data processing module, and two ends thereof are respectively connected to the signal collection end and hydraulic supports of the execution system; the mechanism execution system mainly consists of the hydraulic supports, push-pull rods, and the middle troughs, where the hydraulic supports control positions of the middle trough by means of the push-pull rods.

Tensile and compressive force sensors are mounted on the rear end face of the middle trough at a distance of ¼ of a width of the middle trough from a left side edge and a right side edge respectively, two tensile and compressive force sensors of the same specification are mounted on each middle trough and are labeled A and B, and it is ensured that an imaginary line connecting lifting rings on top of the sensors A and B is parallel to both the upper end and the rear end, where a bolt lifting ring and a positioning force bearing bolt are respectively on the leftmost end and the rightmost end of the middle troughs on the entire working face and are respectively used to assist in positioning two ends of the rope to ensure the overall straightness. One middle trough and one corresponding hydraulic support form one group, and the hydraulic supports and middle troughs on the fully-mechanized coal mining working face are divided into N groups, and are sequentially numbered. An appropriate hydraulic support group and middle trough combination R is selected as a target group according to collected signals, and two adjacent groups (R−1 and R+1) are adjusted by using the target group R as a reference for comparison.

It should be particularly noted that the sensor A in the middle trough in the first group and the sensor B in the middle trough in the $N^{th}$ group located at two ends are respectively the bolt lifting ring and the positioning force bearing bolt, which play a supporting role in place of sensors and mainly withstand a force in the direction of the rope and assist in adjusting the straightness of the scraper conveyor.

The tensile and compressive force sensor is fixedly mounted on the middle trough by means of a bolt assembly, and the bolt assembly includes a bolt and a gasket; the gasket is placed between the tensile and compressive force sensor and the middle trough, and the bolt sequentially passes through the middle trough, the gasket, and the tensile and compressive force sensor, so as to fix the tensile and compressive force sensor to the middle trough.

The flexible element rope sequentially passes through lifting rings on top of all tensile and compressive force sensors, one end of the flexible element rope is fixed to the tensile and compressive force sensor A on the outermost side of the middle troughs in the scraper conveyor terminal, and the other end of the flexible element rope is connected to a device for controlling rope extension and retraction. The device for controlling rope extension and retraction can automatically extend and retract the flexible element rope according to positions of the N middle troughs, so that the flexible element rope can always maintain a certain degree of tension, and thus the tensile and compressive force sensors produce corresponding tensile force and compressive force.

A straightening method in the present invention is described in detail below:

rightward straightness adjustment: a tensile and compressive force value detected by a tensile and compressive force sensor B in the target group R is used as a reference value U (where the compressive force is a positive value and the tensile force is a negative value), if a value of a tensile and compressive force sensor A in the adjacent group (R+1) is greater than the reference value U, a positive voltage signal is generated, and the mechanism execution system controls a hydraulic support to push forward a middle trough in the corresponding group; if a value of a tensile and compressive force sensor A in the adjacent group (R+1) is less than U, a negative voltage signal is generated, and the mechanism execution system controls a hydraulic support to pull back a middle trough in the corresponding group, until the value of the tensile and compressive force sensor B in the target group R and the value of the tensile and compressive force sensor A in the adjacent group (R+1) are equal and are equal to zero. The adjacent group (R+1) that completes positioning is used as a target group for sequentially adjusting adjacent groups, and the aforementioned steps are repeated until all the middle troughs are in a straight line, so as to complete automatic straightening of the scraper conveyor.

Leftward straightness adjustment: a tensile and compressive force value detected by a tensile and compressive force sensor A in the target group R is used as a reference value U, if a value of a tensile and compressive force sensor B in the adjacent group (R−1) is greater than the reference value U, a positive voltage signal is generated, and the mechanism execution system controls a hydraulic support to push forward a middle trough in the corresponding group; if a value of a tensile and compressive force sensor B in the adjacent group (R−1) is less than U, a negative voltage signal is generated, and the mechanism execution system controls a hydraulic support to pull back a middle trough in the corresponding group, until the value of the tensile and compressive force sensor A in the target group R and the value of the tensile and compressive force sensor B in the adjacent group (R−1) are equal and are equal to zero. The adjacent group (R−1) that completes positioning is used as a target group for sequentially adjusting adjacent groups, and the aforementioned steps are repeated until all the middle troughs are in a straight line, so as to complete automatic straightening of the scraper conveyor. Thereby, it is ensured that the middle troughs are in one straight line on the whole to complete adjustment.

What is claimed is:

1. An automatic straightening device for a scraper conveyor on a fully-mechanized coal mining face based on tensile and compressive force sensors, comprising a fully-mechanized coal mining working face;

wherein the fully-mechanized coal mining working face comprises a plurality of middle troughs, and each middle trough is connected to a push-pull rod of a hydraulic support;

wherein, the fully-mechanized coal mining working face is provided with the automatic straightening device, and the automatic straightening device comprises a flexible element rope, the tensile and compressive force sensors, and a signal processing device, wherein;

each middle trough is provided with two tensile and compressive force sensors;

one end of the flexible element rope is connected to a rope extend-retract control device, and an other end of the flexible element rope sequentially passes through lifting rings to be connected to the tensile and compressive force sensors and is fixed to an outermost tensile and compressive force sensor;

the rope extend-retract control device is configured for automatically adjusting extension and retraction of the flexible element rope according to positions of the middle troughs;

the tensile and compressive force sensors are configured for detecting corresponding compressive force $F_Y$ and tensile force $F_L$ according to the extension and retraction of the flexible element rope, and configured for feeding back the detected compressive force $F_Y$ and tensile force $F_L$ to the signal processing device in real time; and according to the compressive force $F_Y$ and tensile force $F_L$ fed back by each tensile and compressive force sensor, the signal processing device compares, one by one, magnitudes of compressive force $F_Y$ and tensile force $F_L$ fed back by two adjacent tensile and compressive force sensors on two adjacent middle troughs, to control a position of a right-side middle trough of the two adjacent middle troughs and an action of a hydraulic support corresponding to the right-side middle trough, until voltage values fed back by the two adjacent tensile and compressive force sensors on the two adjacent middle troughs are equal and are both zero, so as to complete rightward straightness adjustment;

the signal processing device compares, one by one, magnitudes of compressive force $F_Y$ and tensile force $F_L$ fed back by the two adjacent tensile and compressive force sensors on the two adjacent middle troughs, to control a position of a left-side middle trough of the two adjacent middle troughs and an action of a hydraulic support corresponding to the left-side middle trough, until values fed back by the two adjacent tensile and compressive force sensors on the two adjacent middle troughs are equal and are both zero, so as to complete leftward straightness adjustment.

2. The automatic straightening device for a scraper conveyor on a fully-mechanized coal mining face according to claim 1, wherein, the tensile and compressive force sensors are fiber grating tensile and compressive force sensors.

3. The automatic straightening device for a scraper conveyor on a fully-mechanized coal mining face according to claim 2, wherein, one end of the fiber grating tensile and compressive force sensor is mounted on the middle trough, and other end of the fiber grating tensile and compressive force sensor is provided with a lifting ring; the flexible element rope is connected to the corresponding fiber grating sensors via respective lifting rings.

4. The automatic straightening device for a scraper conveyor on a fully-mechanized coal mining face according to claim 3, wherein, the two tensile and compressive force sensors provided with each middle trough are respectively a tensile and compressive force sensor A and a tensile and compressive force sensor B; an imaginary line connecting a center of a lifting ring on the tensile and compressive force sensor A and a center of a lifting ring on the tensile and compressive force sensor B is parallel to both a rear end face and an upper end face of the middle trough.

5. The automatic straightening device for a scraper conveyor on a fully-mechanized coal mining face according to claim 4, wherein, the two tensile and compressive force sensors provided with each middle trough are mounted on the rear end face of the middle trough at a distance of ¼ of a width of the middle trough from a left side edge and a right side edge of the middle trough respectively.

6. The automatic straightening device for a scraper conveyor on a fully-mechanized coal mining face according to claim 1, wherein, the tensile and compressive force sensors are fixedly mounted on the middle trough by means of bolt assemblies.

7. An automatic straightening method for a scraper conveyor on a fully-mechanized coal mining face, comprising the following steps:

for a fully-mechanized coal mining scraper conveyor having N middle troughs, mounting a tensile and compressive force sensor on the rear end face of the middle trough at a distance of ¼ of a width of the middle trough from each side edge of the middle trough, wherein a tensile and compressive force sensor on the left side of the middle trough is a tensile and compressive force sensor A, and a tensile and compressive force sensor on the right side of the middle trough is a tensile and compressive force sensor B; and for each middle trough, an imaginary line connecting a center of a lifting ring on the tensile and compressive force sensor A and a center of a lifting ring on the tensile and compressive force sensor B is parallel to both the rear end face and an upper end face of the middle trough;

connecting one end of a flexible element rope to a rope extend-retract control device and making the other end of the flexible element rope sequentially pass through lifting rings on top of the tensile and compressive force sensors and be fixed to a positioning force bearing bolt on outermost side;

selecting one group as a target group according to information fed back by the tensile and compressive force sensor A and the tensile and compressive force sensor B on each middle trough, wherein compressive force is a positive value and tensile force is a negative value; and adjusting two middle troughs adjacent to the target group by using the target group as a reference for comparison;

rightward straightness adjustment: using a tensile and compressive force value detected by the tensile and compressive force sensor B in the target group as a reference value U; if a tensile and compressive force value detected by a tensile and compressive force sensor A in the adjacent group on the right side is greater than the reference value U, generating a positive voltage signal and controlling a hydraulic support to push forward a middle trough of the corresponding group; if a tensile and compressive force value detected by a tensile and compressive force sensor A in the adjacent group on the right side is less than the reference value U, generating a negative voltage signal and controlling a hydraulic support to pull back a middle trough of the corresponding group, until the tensile and compressive force value detected by the tensile and compressive force sensor B in the target group and the tensile and compressive force value detected by the tensile and compressive force sensor A in the adjacent group on the right side are equal and are equal to zero; using the adjacent group on the right side that completes positioning as a target group for sequentially adjusting adjacent groups rightwards, and repeating the aforementioned steps until all the middle troughs are in a straight line; and leftward straightness adjustment: using a tensile and compressive force value detected by the tensile and compressive force sensor A in the target group as a reference value U, and if a tensile and compressive force value detected by a tensile and compressive force sensor B in the adjacent group on the left side is greater than the reference value U, generating a positive voltage signal and controlling a hydraulic support to push forward a middle trough of the corresponding group; if a tensile and compressive force value detected by a tensile and compressive force sensor in the adjacent group on the left side is less than the reference value U, generating a negative voltage signal and controlling a hydraulic support to pull back a middle trough of the corresponding group, until the tensile and compressive force value detected by the tensile and compressive force sensor A in the target group and the tensile and compressive force value detected by the tensile and compressive force sensor B in the adjacent group on the left side are equal and are equal to zero; using the adjacent group that completes positioning as a target group for sequentially adjusting adjacent groups leftwards, and repeating the aforementioned steps until all the middle troughs are in a straight line.

* * * * *